UNITED STATES PATENT OFFICE.

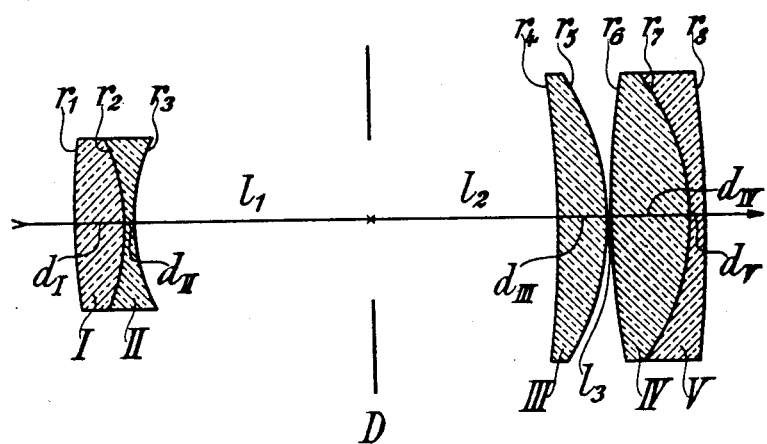

ALBERT KÖNIG, OF JENA, GERMANY, ASSIGNOR TO THE FIRM OF CARL ZEISS, OF JENA, GERMANY.

OBJECTIVE SYSTEM.

1,085,868.     Specification of Letters Patent.     Patented Feb. 3, 1914.

Application filed March 3, 1913. Serial No. 751,812.

*To all whom it may concern:*

Be it known that I, ALBERT KÖNIG, a citizen of the German Empire, residing at Jena, Germany, have invented a new and useful Objective System, of which the following is a specification.

The present invention relates to the objective of such telescopes as are provided with an ordinary ocular and have only a small power (approximating to unity) and a large field of vision. When in such telescopes an objective of the usual construction is made use of, it is necessary to employ a collective lens of great power in the neighborhood of the focal point of the objective, so that the outermost principal rays, which corresponding to the large field of vision have a large inclination relatively to the axis and after passing through the objective retain this inclination practically undiminished, are still able to pass through the ocular. The great power of the collective lens, however, causes a bad concentration of the principal rays in the exit-pupil. This drawback is obviated, according to the present invention, by the objective being formed of a front system consisting of a single or compound dispersive lens and of a rear system consisting of a single or compound collective lens, which latter is disposed at a considerable distance behind the former, and by putting the crossing point of the principal rays between these two systems. The inclination of the outermost principal rays behind the objective is then reduced many times over as compared with their inclination in front of the objective, which latter inclination is given by the required size of the field of vision, so that a weaker collective lens in the neighborhood of the focal point of the objective will be found to suffice. It is favorable for the good correction of an objective, for the sum of the strengths of the positively curved surfaces in the dispersive lens to be, as regards their absolute value, more than twice as great as that of the strengths of the negatively curved ones, and, further, for the sum of the strengths of the negatively curved surfaces in the collective lens to be, as regards their absolute value, more than twice as great as that of the strengths of the positively curved ones. The term positive is in this connection applied to a curvature that turns its convex side toward the incident light, and by the strength of a surface is meant the product derived from its curvature and the difference between the refractive indices of the media bounding the said surface.

The annexed drawing shows an example of the objective according to the present invention in axial section.

In this example the dispersive lens consists of a collective component I and a dispersive component II, which are cemented together, while the collective lens is built up out of a collective single lens III as the front member and of a rear member, which consists of a collective component IV and a dispersive component V, these two latter components being cemented together.

In the following table are given the radii of curvature $r$, the thickness $d$ and the distances $l$ (of the rear surface of the dispersive lens and the front surface of the collective lens from the diaphragm D and of the two members of the collective lens from each other).

*Radii, thicknesses and distances in mm.*

$r_1 = +\ 71$     $d_\mathrm{I} = 5$
$r_2 = -\ 21$     $d_\mathrm{II} = 1$
$r_3 = +\ 19$     $d_\mathrm{III} = 5$
$r_4 = -110$     $d_\mathrm{IV} = 8$
$r_5 = -\ 27$     $d_\mathrm{V} = 1.5$
$r_6 = +\ 90$     $l_1 = 24$
$r_7 = -\ 24$     $l_2 = 19$
$r_8 = -130$     $l_3 = 0.1$

*Kinds of glass.*

$nD_\mathrm{I} = 1.6129$
$nD_\mathrm{II} = 1.6112$
$nD_\mathrm{III} = 1.5163$
$nD_\mathrm{IV} = 1.5163$
$nD_\mathrm{V} = 1.6489$ The focal length of the total system amounts to 56 mm. In this example in the case of the dispersive lens the sum of the strengths of the positively curved surfaces amounts, as regards their absolute value, to 0.023537 and the sum of the strengths of the negatively curved surfaces to 0.000081, for the collective lens the sum of the strengths of the negatively curved surfaces to 0.013895 and the sum of the strengths of the positively curved surfaces to 0.005737.

I claim:

1. Objective system for telescopes of small power and large field of vision, the said objective system consisting of a front dispersive system and a rear collective system and being corrected for a position of the crossing point of the principal rays between the said dispersive and collective systems, in the dispersive system the sum of the strengths of the positively curved surfaces being more than twice as great as the sum of the strengths of the negatively curved surfaces.

2. Objective system for telescopes of small power and large field of vision, the said objective system consisting of a front dispersive system and a rear collective system and being corrected for a position of the crossing point of the principal rays between the said dispersive and collective systems, in the dispersive system the sum of the strengths of the positively curved surfaces being more than twice as great as the sum of the strengths of the negatively curved surfaces and in the collective system the sum of the strengths of the negatively curved surfaces being more than twice as great as the sum of the strengths of the positively curved surfaces.

ALBERT KÖNIG.

Witnesses:
PAUL KRÜGER,
FRITZ LANDER.